United States Patent
Baroux (10) Patent No.: US 10,022,901 B2
(45) Date of Patent: Jul. 17, 2018

(54) METHOD FOR FORMING A FIRE-RESISTANT AND THERMAL-RESISTANT GLASS FIBER PRODUCT, AND ASSOCIATED APPARATUS

(71) Applicant: BLH TECHNOLOGIES INC., Halifax (CA)

(72) Inventor: Daniel Baroux, Nanaimo (CA)

(73) Assignee: BLH Technologies, Inc., Halifax, NS (CA)

(*) Notice: Subject to any disclaimer, the term of this patent is extended or adjusted under 35 U.S.C. 154(b) by 882 days.

(21) Appl. No.: 14/447,170

(22) Filed: Jul. 30, 2014

(65) Prior Publication Data

US 2016/0031132 A1 Feb. 4, 2016
US 2018/0162025 A9 Jun. 14, 2018

Related U.S. Application Data

(63) Continuation of application No. PCT/CA2013/050066, filed on Jan. 30, 2013.
(Continued)

(51) Int. Cl.
B29C 44/34 (2006.01)
C03C 25/007 (2018.01)
(Continued)

(52) U.S. Cl.
CPC ........ B29C 44/3438 (2013.01); B32B 15/046 (2013.01); B32B 21/02 (2013.01);
(Continued)

(58) Field of Classification Search
None
See application file for complete search history.

(56) References Cited

U.S. PATENT DOCUMENTS 2,444,347 A 6/1948 Greger et al.
3,155,533 A 11/1964 Schaschl et al.
(Continued)

FOREIGN PATENT DOCUMENTS

CN 101302420 A 11/2008
DE 196 41 1940 A1 4/1988
(Continued)

OTHER PUBLICATIONS

Supplementary Partial European Search Report for corresponding European App. No. 13 74 3697 dated Sep. 25, 2015.
(Continued)

*Primary Examiner* — Lisa L Herring
(74) *Attorney, Agent, or Firm* — Womble Bond Dickinson (US) LLP (57) ABSTRACT

A method is provided for forming a glass fiber product, by forming a first mixture including dry melt-resistant filiform glass fibers, a fire-retarding solution, and a thickening agent; forming a second mixture including the first mixture and a binding agent, wherein the first mixture and the binding agent being configured to form an expanding foam; and applying the second mixture to a surface prior to the second mixture forming the expanding foam. A method is also provided for forming a glass fiber product, by adding a thickening agent to a fire-retarding solution to form a first mixture; adding a hardening agent to the first mixture to form a second mixture; and adding dry melt-resistant filiform glass fibers to the second mixture to form a paste mixture. Associated apparatuses are also provided.

12 Claims, 3 Drawing Sheets

Related U.S. Application Data (60) Provisional application No. 61/592,369, filed on Jan. 30, 2012.

(51) Int. Cl.
*B32B 15/04* (2006.01)
*B32B 21/02* (2006.01)
*B32B 21/04* (2006.01)
*B32B 29/00* (2006.01)
*C09K 21/00* (2006.01)
*B29K 309/08* (2006.01)
*B29L 31/00* (2006.01)

(52) U.S. Cl.
CPC .......... *B32B 21/047* (2013.01); *B32B 29/007* (2013.01); *C03C 25/007* (2013.01); *C09K 21/00* (2013.01); *B29K 2309/08* (2013.01); *B29L 2031/768* (2013.01); *B32B 2262/101* (2013.01); *B32B 2266/0271* (2013.01); *B32B 2266/0278* (2013.01); *B32B 2266/0285* (2013.01); *B32B 2307/3065* (2013.01); *B32B 2419/00* (2013.01); *B32B 2607/00* (2013.01); *C03C 2218/11* (2013.01)

(56) References Cited

U.S. PATENT DOCUMENTS

| | | | | |
|---|---|---|---|---|
| 3,259,536 A | * | 7/1966 | Gaeth | .......... C04B 28/26 106/18.11 |
| 3,933,514 A | * | 1/1976 | Banks | .......... C04B 28/26 106/602 |
| 4,179,535 A | * | 12/1979 | Kalbskopf | .......... C04B 41/5089 106/18.12 |
| 4,263,048 A | * | 4/1981 | Hacker | .......... C04B 28/26 106/601 |
| 5,837,621 A | | 11/1998 | Kajander | |
| 2003/0198775 A1 | | 10/2003 | Roth et al. | |
| 2008/0254700 A1 | | 10/2008 | Balthes | |

FOREIGN PATENT DOCUMENTS

| | | |
|---|---|---|
| DE | 199 13 511 A1 | 9/1999 |
| EP | 0 179 938 | 5/1986 |
| GB | 1 562 835 | 5/1977 |
| GB | 2 029 834 | 3/1980 |
| JP | 2005-213426 | 8/2005 |
| JP | 2005213426 A * | 8/2005 |

OTHER PUBLICATIONS

International Search Report for corresponding International Application No. PCT/CA2013/050066 dated May 7, 2013.

Written Opinion of the International Searching Authority for corresponding International Application No. PCT/CA2013/050066 dated May 7, 2013.

* cited by examiner

METHOD FOR FORMING A FIRE-RESISTANT AND THERMAL-RESISTANT GLASS FIBER PRODUCT, AND ASSOCIATED APPARATUS

CROSS-REFERENCE TO RELATED APPLICATIONS

This application is a continuation of International Application No. PCT/CA2013/050066, filed Jan. 30, 2013, which International Application was published by the International Bureau in English on Aug. 8, 2013, claims priority to U.S. Provisional Application No. 61/592,369, filed Jan. 30, 2012, all which are incorporated herein by reference in their entirety and for all purposes.

BACKGROUND OF THE DISCLOSURE

Field of the Disclosure

Aspects of the present disclosure relate to methods for forming improved glass fiber products, and, more particularly, to a method for forming a melt-resistant or otherwise thermally-resistant glass fiber product, and associated apparatus.

Description of Related Art

It may sometimes be desirable for particular glass fiber-based products to exhibit resistance to heat, such as that resulting from an incidental fire, in addition to fire resistance. In some instances, such a glass fiber-based insulation product may have a fire-retardant product applied thereto, post-formation, to provide some fire resistance capabilities therefor. That is, an exemplary as-formed filiform glass fiber-based insulation product may have a surface treatment, for example, a liquid fire retardant, applied thereto in order for the treated product to exhibit at least some fire resistance. However, such glass fiber-based insulation products used, for example, in building construction, may be comprised of filiform glass fibers that may tend to melt in the presence of excess heat. Thus, while the treatment of the as-formed glass fiber-based insulation product may be somewhat effective for fire resistance, particularly with a liquid fire retardant, it may be difficult or otherwise inefficient to achieve an even and consistent fire-resistance treatment of that product, and such treatment may not necessarily render the product thermal/heat resistant. More particularly, the result of some fire resistance treatment processes involving application of a liquid fire-retardant to an as-formed glass fiber-based insulation product may be an uneven or otherwise inconsistent coverage of the fire retardant with respect to the product, with insignificant improvement in thermal/heat resistance characteristics. In those cases, the glass-fiber product may pose a hazard in the event of a fire which the product is intended to retard or otherwise provide some resistance to heat and/or flames. Further, such treatment processes may not necessarily be efficient in terms of applying the fire retardant to the glass fiber-based product, may not include provisions for capturing or recycling excess portions of the fire retardant product, and may not have the capability for preventing or restricting losses of the fire retardant due, for instance, to evaporative processes.

Thus, there exists a need for a process and associated apparatus for evenly and consistently applying a fire retardant, particularly a liquid fire retardant, to a filiform glass fiber-based product. In some instances, it may be desirable to form an integral glass fiber product having enhanced characteristics and physical properties over an existing glass fiber product or conventional products used for the same or similar purpose, while also providing an enhanced level of heat and/or fire resistance. It may also be desirable, in some instances, to have a glass fiber-based product formation process with the capability of capturing excess fire retardant and recycling the captured excess in subsequent glass fiber product manufacturing cycles, whether the excess is captured in a liquid form or in other forms, such as vapors.

BRIEF SUMMARY OF THE DISCLOSURE

The above and other needs are met by aspects of the present disclosure, wherein one such aspect relates to a method of forming a glass fiber product. Such a method comprises forming a first mixture including dry melt-resistant filiform glass fibers, a fire-retarding solution, and a thickening agent; forming a second mixture including the first mixture and a binding agent, wherein the first mixture and the binding agent are configured to form an expanding foam; and applying the second mixture to a surface prior to the second mixture forming the expanding foam.

Another aspect of the present disclosure relates to a method of forming a glass fiber product. Such a method comprises adding a thickening agent to a fire-retarding solution to form a first mixture; adding a hardening agent to the first mixture to form a second mixture; and adding dry melt-resistant filiform glass fibers to the second mixture to form a paste mixture.

In some aspects, the fire-retarding solution may be an aqueous fire-retarding solution. It may be preferred that the fire-retarding solution be nontoxic and/or have a neutral pH and/or be hypoallergenic and/or have any number of otherwise desirable properties. In some aspects, the fire-retarding solution may include any one or more of a phosphorus compound, a chlorine compound, a fluorine compound, an antimony compound, a halogen compound, an inorganic hydrate, a bromine compound, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

In yet other aspects, the thickening agent may comprise guar gum and/or other suitable material. The hardening agent may comprise liquid polyurethane, acrylic, and/or other suitable material. The binding agent may comprise methylene diphenyl diisocyanate (MDI) and/or other suitable material.

Associated apparatuses configured, arranged, and/or adapted to execute various method aspects of the present disclosure are also disclosed herein.

Aspects of the present disclosure thus address the identified needs and provide other advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to apparatuses and methods for forming an ignition-resistant (fire-resistant) and/or melt-resistant (thermal-resistant) filiform glass fiber product. As previously discussed, possible limitations in the treatment of as-formed filiform glass fiber products, such as a glass fiber-based insulation or board product, for fire resistance, particularly with a liquid fire retardant, include difficulty in achieving an even and consistent treatment of that glass fiber product, as well as difficulty in effecting thermal/heat resistance in the as-formed product. That is, the result of some fire resistance surface-treatment processes may be an uneven, non-uniform, or otherwise inconsistent or incomplete application of the fire retardant to the glass fiber product. In those cases, such uneven surface treatment may result in varying levels of fire resistance of the treated glass fiber product which may, in turn, become a hazard in the event of a fire which the product is intended to retard or otherwise provide some resistance. Moreover, such surface fire-retardant treatments may have little effect on the overall thermal/heat resistance of the as-formed product.

Figure 2:
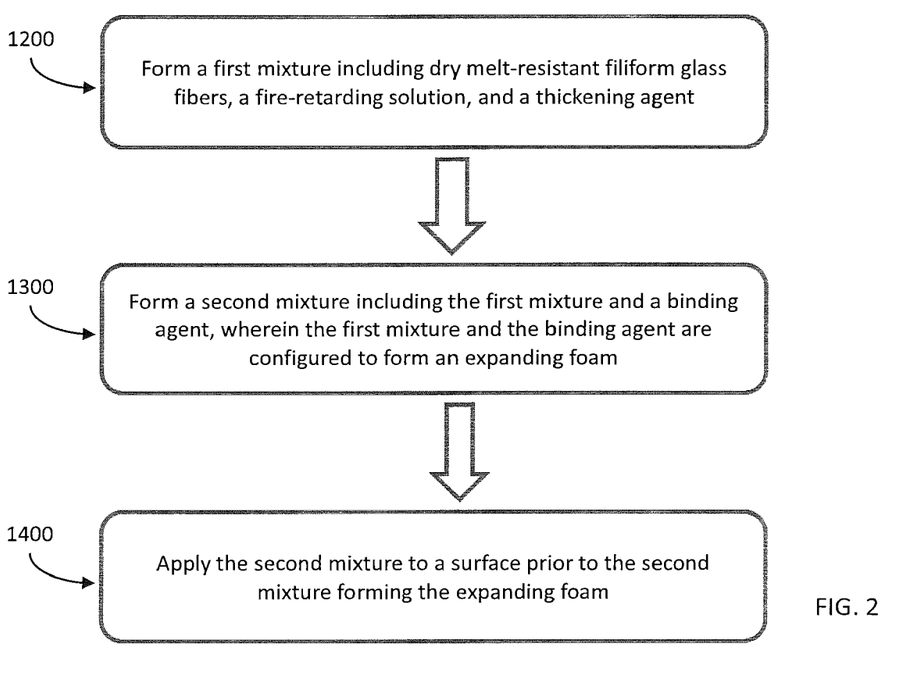
FIG. 2 schematically illustrates a method of forming a glass fiber product, according to one aspect of the disclosure.

In one aspect of the present disclosure, filiform glass fibers, a fire-retarding solution, and a thickening agent (see, e.g., block 1200 in FIG. 2) may be combined to produce a first mixture having the form of a slurry. In this form, the first mixture may be relatively stable and may remain in slurry form for an indefinite period. When a binding agent is added to the first mixture (see, e.g., block 1300 in FIG. 2) to form a second mixture, a reaction occurs between the first mixture and the binding agent to produce the second mixture in the form of a foam material, in some cases an expanding foam material. The foam material subsequently cures into a solid material with varying hardness depending, for example, on the magnitude of expansion of the foam material upon forming the second mixture. The magnitude of the expansion of the second mixture to form the foam material may depend on one or more factors such as, for example, the average length of the filiform glass fibers. For instance, in one aspect, a relatively longer average length of the filiform glass fibers may lower the magnitude of expansion of the foam material, while a relatively shorter average length of the filiform glass fibers (produced, for example, by chopping, grinding, or pulverizing relatively longer filiform glass fibers) may increase the magnitude of expansion of the foam material. In other instances, the variation in the average length of the filiform glass fibers may affect the density of the foam material similarly to the magnitude of expansion. Because the second mixture cures to form the foam material, the second mixture may be applied to a surface before or commensurately with the second mixture forming the expanding foam material and, in any instance, prior to the second mixture curing to form the foam material (see, e.g., block 1400 in FIG. 2). In this manner, the applied second mixture may cure on the selected surface, for example, as a protective coating, which may be resistant to heat, fire and/or ignition and/or may serve as a thermal barrier for the coated surface. One skilled in the art will appreciate that the second mixture may be applied to the surface in many different manners such as, for example, by spraying, brushing, or troweling.

The filiform glass fibers may vary in average length. Such filiform glass fibers may be comprised of, for example, E-glass (i.e., alumino-borosilicate glass with less than about 1% w/w alkali oxides), A-glass (i.e., alkali-lime glass with little or no boron oxide), E-CR-glass (i.e., alumino-lime silicate with less than 1% w/w alkali oxides), C-glass (i.e., alkali-lime glass with high boron oxide content), D-glass (i.e., borosilicate glass), R-glass (i.e., alumino silicate glass without MgO and CaO), and/or S-glass (i.e., alumino silicate glass without CaO but with high MgO content). Such filiform glass fibers may be formed, for example, using a direct melt process or a marble remelt process, wherein bulk glass material is melted and then extruded through appropriate bushings or nozzles. In a continuous filament process, a sizing may be applied to the drawn fibers before the fibers are wound. In a staple fiber process, the glass material can be blown or blasted with heat or steam after exiting a formation machine. For example, in a rotary process formation machine, molten glass enters a rotating spinner, and due to centrifugal force is thrown horizontally/laterally outward, wherein air jets may push the glass vertically downward. In some instances, a binder may be applied to the as-produced glass filaments, and wherein a resulting fiber mat may be vacuumed to a screen and the binder then cured in an oven to form a cohesive mat. As such, the filiform glass fibers implemented herein may vary considerably with respect to the applicability thereof to the disclosed process. One skilled in the art will further appreciate that the average length of the filiform glass fibers may be controlled or otherwise determined in various manners such as, for example, by chopping, grinding, pulverizing, and/or any other action, mechanical or otherwise, that may be applied to relatively long filiform glass fibers to produce relatively short filiform glass fibers.

In some aspects, the filiform glass fibers may be initially interacted with the same or a different fire-retarding solution, prior to being combined into the first mixture/slurry. More particularly, a wetted mixture may first be formed, including filiform glass fibers and the fire-retarding solution. In some instances, the wetted mixture exclusively includes filiform glass fibers interacted with the fire-retarding solution. The wetted mixture may be formed such that the solids content of the fire-retarding solution is substantially uniformly and thoroughly dispersed therethrough. In some instances, the fire retarding solution may substantially coat each of the filiform glass fibers, wherein the coating includes at least some of the solids content of the fire-retarding solution. The wetted mixture may then be de-liquefied, for example, by heating or other suitable drying process, to form dry melt-resistant filiform glass fibers. The dry filiform glass fibers may be rendered melt-resistant by the coating of the glass fibers formed by particular solid components of the fire-retarding solution remaining on the glass fibers following the heating/de-liquefying/drying process and/or bonding of such solid components to the exposed surfaces of the glass fibers. In such instances, the solid coating may form an insulating barrier capable of diffusing incident heat (i.e., provide thermal/heat/melt resistance for the glass fibers)

while also resisting ignition by incident flame (i.e., provide ignition/fire/flame resistance for the glass fibers).

On this basis, according to some aspects, the dry melt-resistant filiform glass fibers themselves may be implemented as a glass fiber end product. For example, the dry melt-resistant filiform glass fibers may be used as blown-in insulation or insulation sheets in bat or roll form. In other aspects, such "pre-treated" filiform glass fibers may be processed, as necessary or desired, in the same of similar manner as previously disclosed herein, so as to prepare pre-treated filiform glass fibers having a particular average length. One skilled in the art will appreciate, however, that the "average length" of the filiform glass fibers disclosed herein do not necessarily require a relatively small or narrow range of fiber lengths. That is, the average length of the glass fibers as used herein is for general guidance only and does not preclude the effectiveness of the methods and apparatuses herein if a relatively large range of lengths of filiform glass fibers is implemented.

Further, in some instances, the glass fibers implemented to form the resulting glass fiber product may be exclusively or substantially exclusively comprised of filiform glass fibers of the type disclosed herein (i.e., excluding materials other than such filiform glass fibers). One skilled in the art will appreciate from the disclosure herein, however, that in some aspects, that contaminants in reasonable levels in the filiform glass fibers will likely have little if any detrimental effect with respect to the resulting as-formed glass fiber product. As such, a decontamination process/apparatus may not necessarily be contemplated (e.g., for the filiform glass fibers), but could be included to perform such decontamination, should there be a need or desire for a contaminant-free glass fiber product.

In some aspects, the fire-retarding solution, used to pre-treat the filiform glass fibers and/or form the first mixture (slurry) with the filiform glass fibers, may include, for example, one or more of a phosphorus compound, a chlorine compound, a fluorine compound, an antimony compound, a halogen compound, an inorganic hydrate, a bromine compound, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof. In this regard, one skilled in the art will appreciate that various fire-retarding or fire resistant substances, either currently known or later developed or discovered, in solution form, may be applicable to the disclosed processes and apparatuses herein within the scope of the present disclosure.

In particular aspects, the fire-retarding solution may be an aqueous fire-retarding solution. It may be preferred that the fire-retarding solution be nontoxic and/or have a neutral pH and/or be hypoallergenic and/or have any number of otherwise desirable properties affecting human/animal and/or environmental safety, while maintaining the necessary efficacy, as implemented and upon exposure of the filiform glass fibers and/or the glass fiber product to heat and/or flame. In some aspects, the fire-retarding solution may include a component which, standing alone, may not necessarily exhibit one or more of the previously-disclosed preferred or desirable properties. However, one skilled in the art will appreciate that other different components of the fire-retarding solution may interact with the noted component so as to neutralize, minimize, or otherwise eliminate, chemically or otherwise, the non-preferred or undesirable properties of the noted component such that the overall fire-retarding solution exhibits one or more of the preferred or desirable properties.

In some aspects, the thickening agent may comprise, for example, guar gum, cornstarch, and/or any other suitable material capable of inducing a thickening effect on the first mixture slurry of filiform glass fibers and the fire-retarding solution.

In yet other aspects, the binding agent may comprise one of a resin material and an adhesive material. In particular instances, the binding agent may comprise methylene diphenyl diisocyanate (MDI). However, one skilled in the art will appreciate that the binding agent 260 may vary considerably, as appropriate, and may comprise other suitable materials such as, for instance, urea formaldehyde (UF) or phenol formaldehyde (PF).

Once the second mixture is formed, the expanding/expandable foam may be applied to a surface comprising a first facing member. Such a first facing member may comprise, for example, Kraft paper, encasement paper, foil, a medium density fiberboard (MDF) sheet, an oriented strand board (OSB) sheet, a particleboard sheet, a metal sheet, or any other suitable sheet member or combinations thereof. If necessary, a bonding material, such as an adhesive or epoxy, may be applied to the facing member, prior to the application of the second mixture, so as to promote adhesion therebetween. In other aspects, a second facing member may also be applied to the second mixture such that the second mixture is disposed between the first and second facing members, wherein the second facing member may be the same as or different from the first facing member.

In instances where either of the first and second facing members comprises encasement paper or Kraft paper (or any other "paper" including cellulose fibers), the paper may be comprised of cellulose fibers and "pre-treated" filiform glass fibers, as previously disclosed. In particular instances, the pre-treated filiform glass fibers may be combined with the cellulose fibers during the papermaking process, as will be appreciated by one skilled in the art. In other instances, the fire-retarding solution may be introduced to a mixture of cellulose fibers and filiform glass fibers during the papermaking process, instead of or in addition to using pre-treated filiform glass fibers. The amount of filiform glass fibers included in the paper may be on the order of between about 5% and about 50% by weight. The inclusion of the filiform glass fibers may, for example, increase the tensile and/or tearing strength of the paper product. In some instances, however, the inclusion of pre-treated filiform glass fibers and/or the use of the fire-retarding solution in the papermaking process may serve to enhance the mechanical properties of the resulting paper. Further, the inclusion of the fire-retarding solution in the formation of the paper product may additionally facilitate a more ignition/fire- and/or thermal/heat-resistant filiform glass fiber product when applied to the expanding foam as the first and/or second facing member. Of course, one skilled in the art will appreciate that the paper product including the filiform glass fibers may itself be implemented as a stand-alone ignition/fire- and/or thermal/heat-resistant product, as necessary or desired.

When formed with the first and/or second facing member, the assembly including the foam material may additionally be planarized to form a sheet of regular thickness. Such planarization may be accomplished, for example, using a press roll arrangement or other suitable mechanical shaping process. Upon planarization, the resulting sheet having the foam material with the first facing member, or both the first and second facing members, engaged therewith may be used, for example, as a wallboard substitute for convention gypsum-based drywall.

Figure 1:
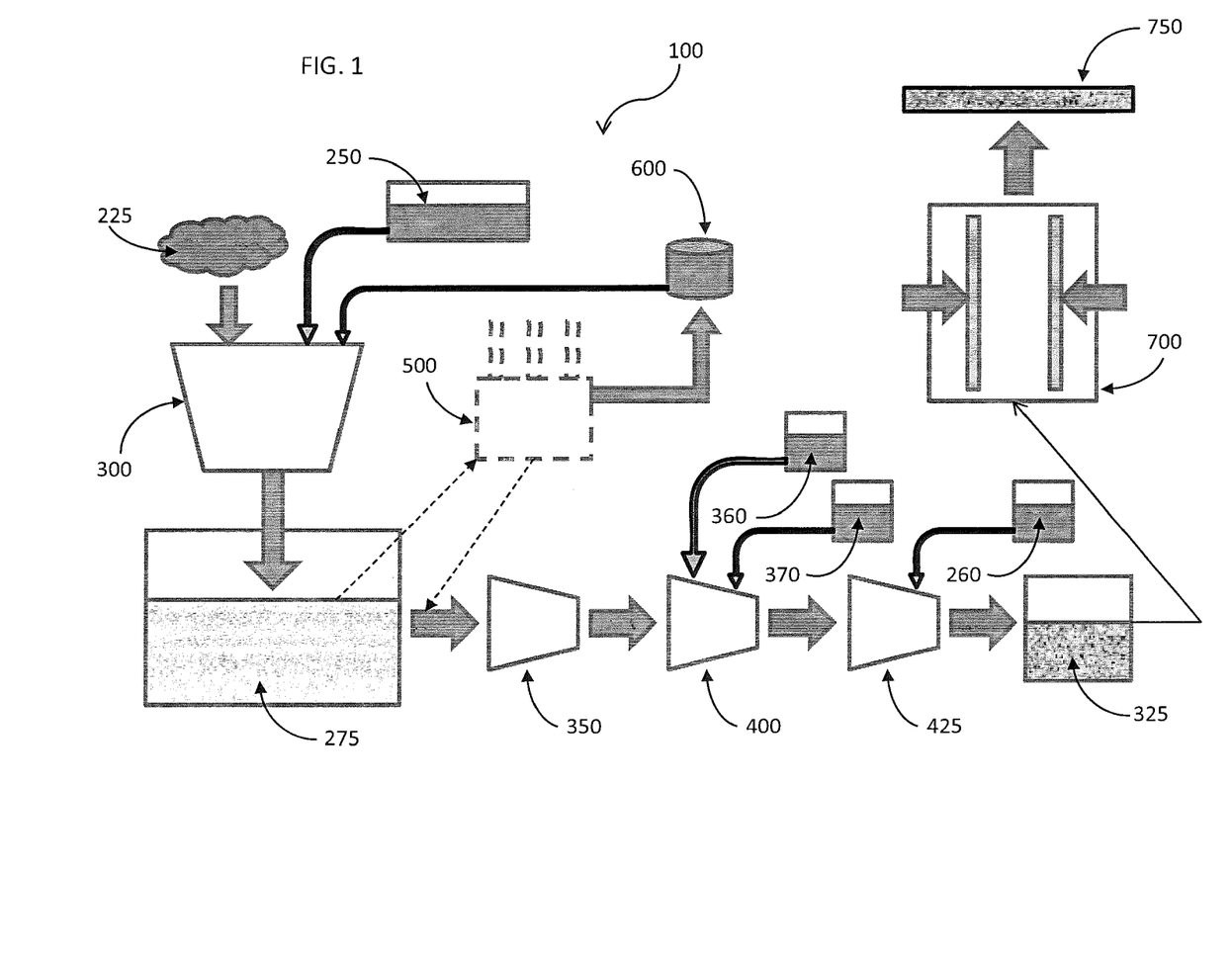
FIG. 1 schematically illustrates an apparatus for forming a glass fiber product, according to one aspect of the disclosure.

In view of the preceding, one aspect of the present disclosure may involve an apparatus for forming an ignition/fire- and or thermal/heat/melt-resistant filiform glass fiber product, such an apparatus being indicated as element 100 in FIG. 1. Such an apparatus 100 may comprise, for example, a first mixing device 300 configured to form a wetted mixture 275 from filiform glass fibers 225 and a first fire-retarding solution 250, such that the wetted mixture 275 has a solids content of the first fire-retarding solution 250 substantially uniformly and thoroughly dispersed therethrough. A first processing device 500 may also be provided to de-liquefy the wetted mixture so as form dry, treated filiform glass fibers. A second processing device 350 may then be configured to receive the dry, treated filiform glass fibers, and/or in some instances, untreated filiform glass fibers. The second processing device 350 may be further configured to process the filiform glass fibers so as to refine the filiform glass fibers to a desired average length. A second mixing device 400 is configured to form a cohesive mixture from the processed filiform glass fibers, a second fire-retarding solution 360, and a thickening agent 370. In some instances, the cohesive mixture may be directed to a third mixing device 425 configured to add a binding agent 260 thereto, wherein the resulting activated mixture 325 may then be directed to a forming device 700 to have one or more facing members applied thereto and/or to planarize the resulting formed glass fiber product 750 comprising the expanded foam material.

In forming the wetted mixture 275, the first mixing device 300 may be configured to substantially saturate the filiform glass fibers 225 with the first fire-retarding solution 250, wherein the first fire-retarding solution 250 has a first concentration of the particular solids content, and/or the first mixing device 300 may be configured to form a slurry from the filiform glass fibers 225 and the first fire-retarding solution 250. In some instances, the first mixing device 300 may also be configured to add water and/or other appropriate liquid or chemical to the filiform glass fibers 225 and first fire-retarding solution 250 to form the slurry.

One skilled in the art will further appreciate that the fire-retarding solution (whether the first or second fire-retarding solution, as referenced herein) may be formed by adding a solid fire-retardant product to a liquid (i.e., water) or other chemical mixed with the filiform glass fibers such that the solid fire-retardant product forms a solution with the liquid or other chemical comprising a slurry with the filiform glass fibers 225. In other instances, the solution formed from the solid fire-retardant product and the liquid or other chemical may be used to form the wetted mixture 275 with the filiform glass fibers 225. In some aspects, the first mixing device 300 may be configured to agitate the slurry or wetted mixture, so as to substantially uniformly distribute the fire-retarding solution therethrough. In other aspects, the first mixing device 300 may be configured to manipulate the wetted mixture 275, such that the solids content of the fire-retarding solution is substantially uniformly and thoroughly dispersed through the wetted mixture. The first mixing device 300 may be any machine suitable for forming the wetted mixture and/or the slurry from the filiform glass fibers and the fire-retarding solution, in the various manners discussed.

In another aspect, the first mixing device 300 may be, in some cases, configured to interact the filiform glass fibers 225 with the fire-retarding solution such that the fire retarding solution substantially coats each of the filiform glass fibers. In yet another aspect, the fire-retarding solution itself may be configured to substantially coat each of the filiform glass fibers when interacted therewith. In such instances, the fire-retarding solution may interact with the filiform glass fibers, for example, such that the fire-retarding solution or a component thereof etches the exposed surfaces of the glass fibers so as to promote and/or facilitate bonding of particular solid components of the fire-retarding solution with the exposed surfaces of the glass fibers and/or formation of a coating over the exposed surfaces.

In some particular aspects, in order to facilitate interaction between the fire-retarding solution and the glass fibers, a processing device 500 may be provided to de-liquefy the wetted mixture 275, and to form dry melt-resistant filiform glass fibers. The processing device 500, such as a dryer, may thus be provided, as necessary and as will be appreciated by one skilled in the art, to process the wetted mixture 275 to form the dry melt-resistant filiform glass fibers. In one aspect, the processing device 500 may be configured to apply heat to the wetted mixture 275, for example, via heated air (i.e., air heated with combusted natural gas or other suitable fuel source), or through any of a variety of heating/de-liquefying/drying methods, such as, for example, microwave or infrared drying techniques, as will be appreciated by one skilled in the art.

In instances where the first mixing device 300 is configured to form a slurry from the filiform glass fibers and the fire-retarding solution, the processing device 500 may be configured to dewater the slurry, before drying the dewatered slurry to form the dry melt-resistant filiform glass fibers. Such a dewatering process may be accomplished, for example, by a suitably modified Fourdrinier-type machine, or other appropriate process, as will be appreciated by one skilled in the art. The slurry may also be dewatered, for instance, using a twin wire forming section and/or appropriate screening devices. Further, as previously disclosed, in order to dry the dewatered slurry, the processing device 500 may be configured to apply heat to the wetted mixture, for example, via heated air (i.e., air heated with combusted natural gas or other suitable fuel source), or through any of a variety of heating/de-liquefying/drying methods, such as, for example, microwave or infrared drying techniques, as will be appreciated by one skilled in the art. One skilled in the art will also appreciate that the processing device 500 may be configured in many different manners. For example, a suitably-configured screen device may be configured to receive the slurry, wherein the screen device may include a number of perforations. Once deposited in the screen device, the slurry may be engaged by an opposing platen, which may also be perforated. The perforations may serve to dewater the slurry, while the platen and/or the screen device may be heated to provide for drying of the dewatered slurry. In other instances, the processing device 500 may comprise, for example a press arrangement configured to apply pressure to the slurry to force out the liquid portion thereof.

In some aspects, the apparatus 100 may also comprise a recovery device 600 configured to recover excess fire-retarding solution, in one of a liquid and a vapor form, upon the processing device 500 de-liquefying/drying the wetted mixture 275. In some instances, the recovery device 600 may also be configured to engage the first mixing device 300 for accomplishing the recovery of the excess fire-retarding solution. That is, the recovery device 600 may be configured to direct the recovered excess fire-retarding solution, removed from the wetted mixture upon de-liquefication thereof by the processing device 500, to the mixing device 300, for example, in a closed-loop, fire-retarding solution recycling process. Upon recovery of the excess portions, including liquids and vapors, by the recovery device 600, the recovered excess fire-retarding solution may be strained, filtered, or otherwise purified, and then reintroduced to the first mixing device 300 to form subsequent portions of the wetted mixture 275, such that the fire-retarding solution is substantially or entirely prevented from leaving the apparatus 100 as a waste product.

A second processing device 350 may then be configured to receive the dry, treated filiform glass fibers, and/or in some instances, untreated filiform glass fibers. That is, the disclosed process hereinafter discussed may be configured to implement filiform glass fibers "pre-treated" with the fire-retarding solution, untreated filiform glass fibers, or a combination thereof. As such, in some aspects, the first mixing device 300/processing device 500 may be bypassed, particularly when implementing untreated filiform glass fibers. The second processing device 350 may be further configured to process the filiform glass fibers so as to refine the filiform glass fibers to a desired average length. As necessary or desired, the second processing device 350 may be configured, for example, to chop, grind, pulverize, or otherwise manipulate dry filiform glass fibers, whether treated with the fire-retarding solution or untreated, to reduce filiform glass fibers having a relatively longer average fiber length to filiform glass fibers having a relatively shorter average fiber length. In some aspects, the second processing device 350 may not be necessary if the filiform glass fibers are initially provided with the necessary or desired average fiber length.

A second mixing device 400 may then be configured to form a cohesive mixture from the processed filiform glass fibers (processed by the second processing device 350), a second fire-retarding solution 360, and a thickening agent 370. The second fire-retarding solution may be the same as, or different from, the first fire-retarding solution. If the second fire-retarding solution is different from the first fire-retarding solution, it may be preferable for the second fire-retarding solution to enhance the fire-retarding properties of the first fire-retarding solution, or at least to have limited or no negative interaction with the first fire-retarding solution. In some aspects, the thickening agent may comprise, for example, guar gum, cornstarch, and/or any other suitable material capable of inducing a thickening effect on the first mixture slurry of filiform glass fibers and the fire-retarding solution. Once combined by the second mixing device 400, the cohesive mixture may remain stable an in the as-mixed form for a particular time duration. In some instances, the time duration may be indefinite.

In some instances, the cohesive mixture may be directed to a third mixing device 425 configured to add a binding agent 260 thereto to form a second mixture 325. The binding agent may comprise, for example, one of a resin material, an epoxy material, and an adhesive material. In particular instances, the binding agent may comprise methylene diphenyl diisocyanate (MDI). However, one skilled in the art will appreciate that the binding agent 260 may vary considerably, as appropriate, and may comprise other suitable materials such as, for instance, urea formaldehyde (UF) or phenol formaldehyde (PF). The third mixing device may be configured to agitate or otherwise manipulate the second mixture so as to thoroughly mix the binding agent with the cohesive mixture. In particular aspects, the binding agent may react with the cohesive mixture to form a foam material, wherein the foam material may exhibit a particular amount of expansion due to the reaction. As previously discussed, the magnitude of the expansion may be dependent upon different factors such as, for example, the average length of the filiform glass fibers implemented in the process.

In aspects including the third mixing device 425/cohesive mixture 325/binding agent 260, there may be a short duration onset of a reaction between the cohesive mixture and the binding agent, as well as a short duration to cure. Accordingly, in some instances, the third mixing device may be disposed in close proximity to the surface to which the second mixture/activated foam material is to be applied. In other instances, the resulting activated mixture may be directed from the third mixing device to a forming device 700, for example, to have one or more facing members (i.e., as the application "surface") applied thereto and/or to planarize the resulting formed glass fiber product 750 comprising the expanded foam material.

In other aspects, the forming device 700 may be implemented in different manners to form the cohesive mixture into the formed glass fiber product 750. For example, the forming device 700 may be configured to compress the second mixture (foam material) to form a densified glass fiber product, extrude the second mixture to form the formed glass fiber product, spray the second mixture to form the formed glass fiber product, and/or mold the second mixture to form the formed glass fiber product. One skilled in the art will appreciate, from the disclosure herein, that the second mixture, and the glass fiber product formed therefrom, are distinguished from fiberglass (also called glass-reinforced plastic (GRP), glass fiber-reinforced plastic (GFRP), or fiber-reinforced plastic (FRP)). That is, "fiberglass" is generally characterized as a fiber reinforced polymer made of a plastic or polymeric matrix reinforced by fine fibers of glass, wherein the plastic/polymer matrix may be, for example, an epoxy, a thermosetting plastic (i.e., polyester or vinylester), or a thermoplastic. In contrast, aspects of the present disclosure implement a second mixture that, upon reaction of the components thereof, forms a foam material for which the magnitude of expansion can be manipulated or otherwise controlled. As such, the resulting glass fiber product may be characterized, for instance, as a filiform glass fiber network, wherein the glass fibers treated with the fire-retarding solution are held together in a cohesive manner through reaction between the fire-retarding solution, the thickening agent, and/or the binding agent, in cooperation with the filiform glass fibers.

One skilled in the art will also appreciate that, according to some aspects of the present disclosure, the second mixture may itself be ignition-resistant/melt-resistant due to the ignition-resistant/melt-resistant characteristics of the glass fibers, wherein such ignition-resistance/melt-resistance may be facilitated, in some instances, through heat and/or fire resistance characteristics of the selected binding agent (i.e., the second mixture may in and of itself provide thermal/heat/melt resistance protective characteristics). The second mixture may also be capable of resisting ignition by incident flame (i.e., provide ignition/fire/flame resistance characteristics). On this basis, according to some aspects, the second mixture itself may be implemented as all of part of a glass fiber end product. For example, the second mixture may be applied, whether via the forming device 700, or independently thereof, to various as-formed products as a "coating" formed upon suitable application of the second mixture to the product upon actuation thereof via the binding agent. In one case, for instance, the second mixture may be applied to various products to form a protective "coating" therefor. For example, the second mixture may be applied to various components of a building, such as a floor, interior or exterior walls, or even individual support beams, whether wood-based or metal, or otherwise applied as an encasement element (in any instance, upon suitable actuation thereof via the binding agent).

One skilled in the art will further appreciate that, in some instances, the second mixture may be manipulated in different manners using variants of the forming device 700 to achieve different end products. For example, in some instances, the second mixture may form one or more layers of the resulting product, which may be in a composite or pseudo-laminate form.

In some aspects, the glass fiber product 750 may be formed as a sheet or board having a desired length, width, and thickness, or as a continuous sheet that is later subdivided into segments of a desired length. In some instances, the forming device 700 may be configured to engage the second mixture with one of a negative die and a positive die, so as to form a glass fiber product having a surface defining a negative impression of the one of the negative die and the positive die. That is, for example, various platen may be appropriately patterned with a raised and/or depressed pattern such that the formed glass fiber product will have a corresponding surface defining a negative impression of the pattern. One skilled in the art will also appreciate that the capability of manipulating the second mixture in this manner indicates that the final form of the glass fiber product need not necessarily be in planar form, but may take many different shapes, contours, and sizes in addition to that disclosed herein. For example, the final form of the glass fiber product may be determined by forming, molding, extrusion, pressing, stamping, or by any other suitable manipulation procedure/production method.

Further, in some instances, the glass fiber product formed in accordance with aspects of the present disclosure, particularly through treatment of the filiform glass fibers with the fire-retarding solution, may provide a more uniform and thorough dispersion and distribution of the fire-retarding solution within the formed glass fiber product, thus enhancing fire resistance (flame spread), as well as thermal barrier (thermal resistance/insulation) and/or other characteristics.

Since one of the aspects disclosed herein involves a wallboard substitute for convention gypsum-based drywall, it follows that it may be advantageous to have other aspects of a wall construction system also rendered ignition/fire- and/or thermal/heat/melt-resistant. As such, another aspect of the present disclosure comprises a "drywall mud" or joint compound material, wherein the characteristics of such materials will be appreciated by one skilled in the art. For instance, it is known that seams between conventional drywall sheets, once the drywall sheets are mounted to a wall structure, are covered and smoothed by "drywall mud" or joint compound, sometimes with the use of a fibrous "joint tape." Once the mud is applied to the seam, roughly smoothed, and allowed to dry, the mudded seam may be sanded to hide the seam and then painted if necessary or desired. As such, it may be necessary for such a mud to be smoothable, sandable, and/or paintable. In some instances, it may be desirable for such a mud to be water resistant, mold resistant, and/or termite resistant. Further, it may be desirable for such a mud to exhibit a certain tensile strength (i.e., to resist cracking at the seam in the event of expansion/contraction or other mechanical event), and to be ignition/fire- and thermal/heat/melt resistant.

Accordingly, one such aspect is directed to a drywall mud or joint compound comprising filiform glass fibers, a fire-retarding solution, a thickening agent, and a hardening agent. The fire-retarding solution may comprise the particular materials as previously disclosed. More particularly, the fire-retarding solution may include, for example, one or more of a phosphorus compound, a chlorine compound, a fluorine compound, an antimony compound, a halogen compound, an inorganic hydrate, a bromine compound, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoro ethane, dibromodifluoromethane, carbon tetrachloride, urea-potassium bicarbonate, and combinations thereof. In this regard, one skilled in the art will appreciate that various fire-retarding or fire resistant substances, either currently known or later developed or discovered, in solution form, may be applicable to the disclosed processes and apparatuses herein within the scope of the present disclosure.

The filiform glass fibers may be pre-treated with a fire-retarding solution, which may be the same as or different from the fire-retarding solution used to form the compound, in a similar manner to that previously disclosed (or may remain untreated in some aspects). In one particular instance, the filiform glass fibers are pre-treated with the fire-retarding solution (i.e., wetted and de-liquefied, in a process as previously disclosed), and then processed to obtain a desired average fiber length. In some aspects, the thickening agent may comprise, for example, guar gum, cornstarch, or any other suitable material capable of inducing a thickening effect on the first mixture slurry of filiform glass fibers and the fire-retarding solution. The hardening agent may comprise, for example, liquid polyurethane (i.e., clear polyurethane sealer used for coating and protecting exterior wood), acrylic, and/or any other suitable hardening agent. One skilled in the art will appreciate that the hardening agent may vary, as appropriate, but will generally be characterized as a liquid product that remains in liquid form when contained, but hardens upon exposure to the atmosphere or environment.

In one aspect, the filiform glass fibers, the fire-retarding solution, the thickening agent, and the hardening agent, when combined, produce a mixture in the form of a pliable paste that may be troweled or is otherwise spreadable, smoothable, sandable (once dried/hardened), and paintable. In some instances, the mixture may be produced with a thinner consistency which may allow, for instance, the mixture to be applied to a surface as a skim coating, or directed through a sprayer for application to a surface. In other instances, a thicker coating of the mixture may provide a thermal (insulating) barrier for the surface to which it is applied. Such applications are premised upon the mixture being exposed to atmosphere or the environment, which causes the mixture to dry and harden. However, in a similar manner to drywall mud/joint compound, the mixture may remain in a pliable, non-hardened state for an extended time duration, as long as the mixture is isolated (i.e., contained in a container) from the atmosphere or environment.

Figure 3:
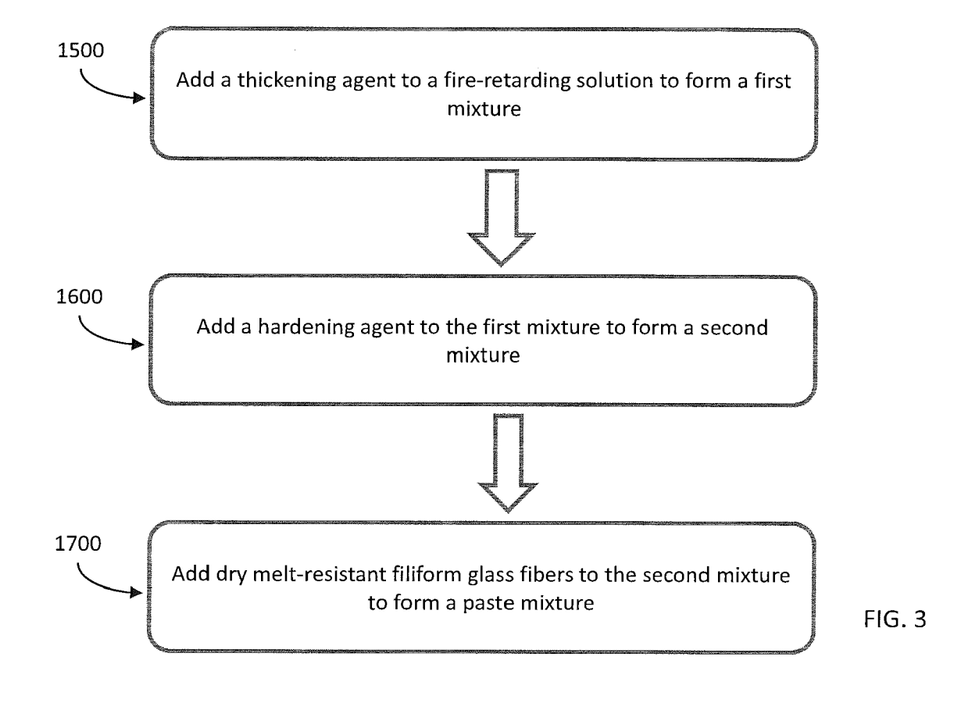
FIG. 3 schematically illustrates a method of forming a glass fiber product, according to another aspect of the disclosure.

In another aspect, the noted components of the mixture may be combined in a particular order to produce desirable characteristics of the mixture. For example, the thickening agent (i.e., guar gum) may be first added to the fire-retarding solution (see, e.g., block 1500 in FIG. 3), on the order of between about 1% and about 10% by weight of the fire-retarding solution. In one instance, the thickening agent may be added to the fire-retarding solution in an amount equal to about 2% by weight of the fire-retarding solution.

The hardening agent is then added to the fire-retarding solution/thickening agent mixture (see, e.g., block 1600 in FIG. 3), on the order of between about 5% and about 65% by weight of the fire-retarding solution. In one instance, the hardening agent may be added to the fire-retarding solution/thickening agent mixture in an amount equal to about 50% by weight of the fire-retarding solution.

Finally, the filiform glass fibers are then added to the fire-retarding solution/thickening agent/hardening agent mixture (see, e.g., block 1700 in FIG. 3), on the order of between about 35% and about 65% by weight of the fire-retarding solution. In one instance, the filiform glass fibers may be added to the fire-retarding solution/thickening agent/hardening agent mixture in an amount equal to about 50% by weight of the fire-retarding solution. In order to obtain the necessary or desired average length of the filiform glass fibers, the treated or untreated filiform glass fibers may be appropriately processed, for example, by fluffing, chopping, grinding, pulverizing, or the like. In some instances, it has been found that relatively short average fiber lengths (i.e., ground filiform glass fibers) may provide a less viscous resulting mixture, while a relatively long average fiber length (i.e., fluffed filiform glass fibers) may provide a more viscous resulting mixture.

In some instances, the less viscous resulting mixture may be applied as a cover coating for a particular surface (i.e., as a skim coat over an existing sheet of convention gypsum-based drywall). Accordingly, the skim coat may provide ignition/fire-resistance of the underlying conventional drywall. In thicker coats of the resulting mixture, the coating may additionally serve, for example, as a thermal barrier or insulation layer for the underlying surface. In other instances, where the resulting mixture may be applied as "drywall mud," the mixture may be applied over or in conjunction with fibrous joint tape. In still other instances, the fibrous joint tape itself may be comprised of filiform glass fibers treated with a fire-retarding solution of the type disclosed herein, thereby rendering the joint tape ignition/fire- and/or thermal/heat/melt-resistant. Accordingly, aspects of the present disclosure also contemplate a structure construction system implementing one or more of the end products disclosed herein. For example, the expandable foam and encasement paper end products may be used to produce the wallboard substitute, which may then be attached to the frame structure of a wall. In some instances, the frame structure may be sprayed with expanding foam as an ignition/fire- and/or thermal/heat-resistant coating therefor. In still other instances, voids in the frame structure may be filled with filiform glass fibers treated with a fire-retarding solution of the types disclosed herein, wherein such treated glass fibers (i.e., in batt or loose fill form) may provide an ignition/fire- and/or thermal/heat resistant insulation product therefor. Seams between the sheets of the wallboard substitute may be covered with fibrous joint tape comprised of filiform glass fibers treated with a fire-retarding solution of the types disclosed herein, and the tape/seam then mudded by a "drywall mud" or joint compound disclosed herein as aspects of the present disclosure. In some instances, the joint compound disclosed herein may be applied as a skim coat over the wallboard substitute to provide additional ignition/fire- and/or thermal/heat/melt-resistance properties for the wall structure. Such a joint compound can then be sanded and painted, as with conventional wall structures.

Many modifications and other aspects of the disclosures set forth herein will come to mind to one skilled in the art to which these disclosures pertain having the benefit of the teachings presented in the foregoing descriptions and the associated drawings. In some instances, the first mixing device 300 may be configured to add and/or receive other appropriate substances/materials/chemicals for addition to the filiform glass fibers. For example, the first mixing device 300 may be configured to receive a mold inhibitor; a water repellant, waterproofing, and/or otherwise water resistant substance. In some instance, the filiform glass fibers themselves may provide a measure of termite resistance, or a separate termite inhibitor may be added. In any instance, it may be preferable that any additional substances received into the filiform glass fibers be suitably processed by the first mixing device 300 so as to be substantially uniformly and thoroughly distributed and dispersed within the filiform glass fibers. Therefore, it is to be understood that the disclosures are not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method of forming a glass fiber product, said method comprising:
   forming a wetted mixture including filiform glass fibers and a first portion of a fire-retarding solution, the wetted mixture having a solids content of the fire-retarding solution substantially uniformly and thoroughly dispersed therethrough;
   de-liquefying the wetted mixture to form dry melt-resistant filiform glass fibers;
   forming a first mixture including the dry melt-resistant filiform glass fibers, a second portion of the fire-retarding solution, and a thickening agent;
   forming a second mixture including the first mixture and a binding agent comprising methylene diphenyl diisocyanate (MDI), the first mixture and the binding agent being configured to form an expanding foam; and
   applying the second mixture to a surface prior to the second mixture forming the expanding foam.

2. A method according to claim 1, wherein forming the wetted mixture comprises interacting the filiform glass fibers with the first portion of the fire-retarding solution such that the fire retarding solution substantially coats each of the filiform glass fibers.

3. A method according to claim 1, wherein forming the wetted mixture comprises interacting exclusively filiform glass fibers with the first portion of the fire-retarding solution.

4. A method according to claim 1, wherein forming one of the first mixture and the wetted mixture comprises forming one of the first mixture and the wetted mixture with the fire-retarding solution comprising one of a phosphorus compound, a chlorine compound, a fluorine compound, an antimony compound, a halogen compound, an inorganic hydrate, a bromine compound, magnesium hydroxide, hydromagnesite, antimony trioxide, a phosphonium salt, ammonium phosphate, diammonium phosphate, methyl bromide, methyl iodide, bromochlorodifluoromethane, dibromotetrafluoroethane, dibromodifluoromethane, carbon tetrachloride, urea-potassium bicarbonate, and combinations thereof.

5. A method according to claim 1, wherein the thickening agent comprises guar gum.

6. A method according to claim 1, wherein the binding agent comprises one of a resin material and an adhesive material.

7. A method according to claim 1, wherein applying the second mixture to the surface comprises applying the second mixture to the surface comprising a first facing member.

8. A method according to claim 7, further comprising applying a second facing member to the second mixture such that the second mixture is disposed between the first and second facing members.

9. A method according to claim 1, wherein applying the second mixture to the surface further comprises one of spraying the second mixture, brushing the second mixture, and troweling the second mixture on the surface.

10. A method according to claim 1, further comprising one of fluffing, chopping, grinding, and pulverizing the dry melt-resistant filiform glass fibers prior to forming the first mixture.

11. A method according to claim 10, further comprising varying an average length of the dry melt-resistant filiform glass fibers so as to vary a magnitude of expansion of the expanding foam, the magnitude of expansion of the expanding foam being inversely proportional to the average fiber length.

12. A method according to claim 1, wherein forming one of the first mixture and the wetted mixture further comprises forming one of the first mixture and the wetted mixture with one of an aqueous fire-retarding solution, a nontoxic liquid fire-retarding solution, and a neutral pH liquid fire-retarding solution.

* * * * *